United States Patent [19]
LaFontsee et al.

[11] Patent Number: 4,772,207
[45] Date of Patent: Sep. 20, 1988

[54] KIT AND METHOD FOR DEMONSTRATING CARPET CLEANING PRINCIPLES

[75] Inventors: Lawrence J. LaFontsee; Ernest Middleton; Geoffrey R. Greeley, all of Racine, Wis.

[73] Assignee: Racine Industries, Inc., Racine, Wis.

[21] Appl. No.: 942,816

[22] Filed: Dec. 17, 1986

[51] Int. Cl.$^4$ ............................................. G09B 25/00
[52] U.S. Cl. ................... 434/365; 206/45.14; 206/579
[58] Field of Search .............. 434/365, 366, 367, 369, 434/370, 382, 429; 206/45.14, 45.34, 579

[56] References Cited

U.S. PATENT DOCUMENTS

| | | | |
|---|---|---|---|
| 1,296,158 | 3/1919 | Bonham | 206/45.14 |
| 2,184,406 | 12/1939 | Troxler | 434/370 |
| 2,745,195 | 5/1956 | Gombert | 434/367 |
| 3,973,335 | 8/1976 | Price | 434/370 |
| 4,396,121 | 8/1983 | Lemmon | 206/45.34 X |

Primary Examiner—William H. Grieb
Attorney, Agent, or Firm—Peter N. Jansson

[57] ABSTRACT

A kit for visual demonstration of principles relating to carpets and carpet care. The kit includes a horizontal base member, vertical members removably securable in erect position with respect to the base member at their proximal ends, and means on the base member to hold the vertical members in carrying position when not in their erect positions. A highly preferred base member is a transparent rigid box with spaced upper and lower walls, the vertical members being attacked to the lower wall and extending loosely through openings in the upper wall.

The method includes applying dirt onto a shaft near its distal end and, when the shaft is erect on the lower wall of the preferred base member, executing a cleaning step. The cleaning step may involve applying a free liquid, which carries dirt through the opening into the rigid box, or rubbing with a damp wiper and then removing the dirty wiper from a position on top of the rigid box.

22 Claims, 2 Drawing Sheets

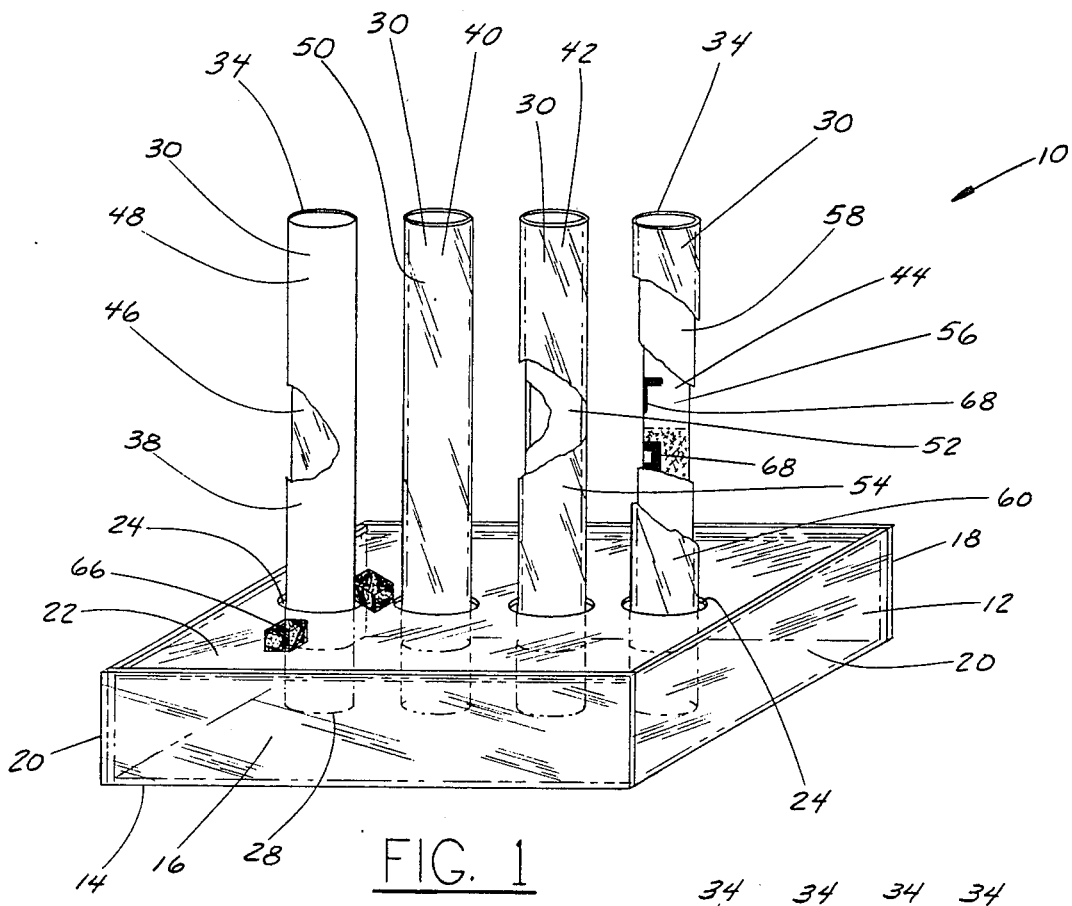
FIG. 1
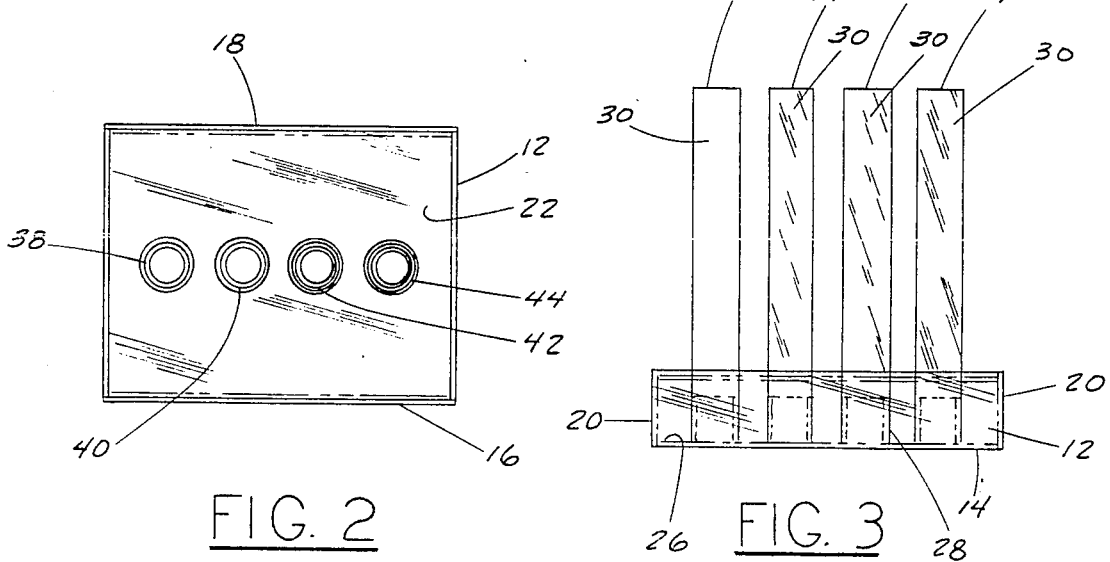
FIG. 2
FIG. 3

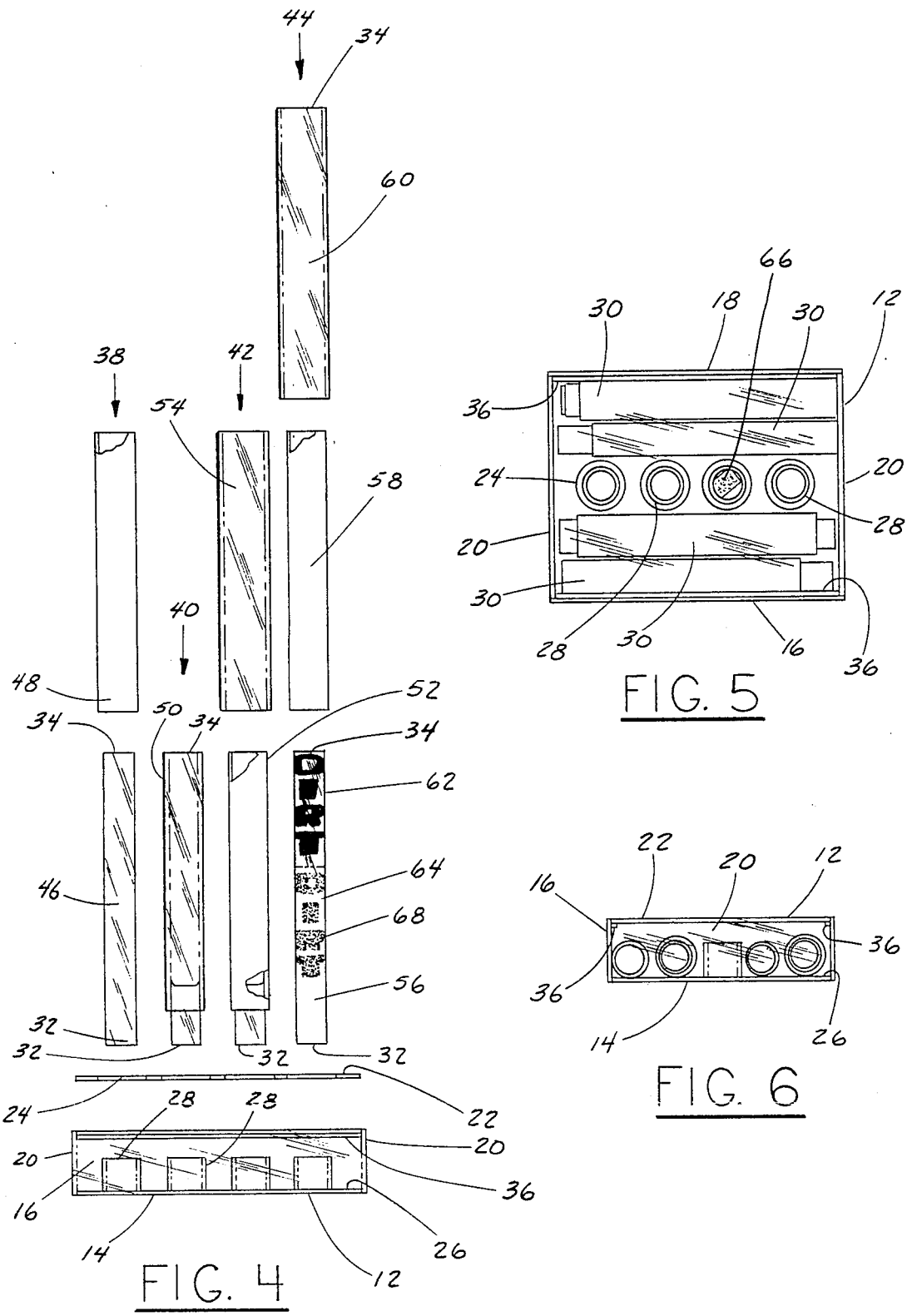

4,772,207

KIT AND METHOD FOR DEMONSTRATING CARPET CLEANING PRINCIPLES

FIELD OF THE INVENTION

This invention is related generally to visual demonstrations of scientific principles, and, more particularly, to methods and means for demonstrating principles relating to carpet care.

BACKGROUND OF THE INVENTION

Understanding carpet construction, how carpet becomes soiled, and particularly how carpet releases soil is essential to proper carpet care. Developing a thorough understanding of such carpet-care principles forms the basis for successful carpet maintenance planning and often dictates the choice of a specific carpet-cleaning method. The benefits are substantially improved carpet appearance, substantially extended carpet life, and cost-effective carpet maintenance.

On the other hand, a failure to appreciate such carpet-cleaning principles often results in an unreasonable use of discredited carpet-cleaning techniques, particularly wet carpet-cleaning techniques. This, in turn, leads to a number of readily avoidable carpet-maintenance problems. Such problems may be immediately severe and expensive, particularly when occurring on major new carpet installations, or at least will be harmful to the appearance and useful life of the carpet.

Broadly stated, the problems of such wet carpet cleaning techniques involve the retention of too much dirt on and in the carpet, the accumulation of dirt and other residues deep in the carpet, and the damage that water and cleaning solutions can cause, particularly deep in the carpet. The damage to carpets from wet cleaning methods, in addition to those related to the retention of dirt and solution residues, can include: shrinkage, seam splitting, delamination; mildew, mold, and rotting; dye bleeding, dulling, and other discoloration.

Thus, the importance of gaining a clear understanding of carpet and the principles of carpet care can be seen. And, the importance of clearly and easily conveying such carpet-care principles can be seen. It is to these ends that this invention is directed.

This invention will be better understood after a brief discussion of certain carpet-care principles.

Carpet includes a pile made up of generally vertically oriented yarns which are attached to a carpet backing. The yarns are made up of many small thin fibers which are twisted together in some fashion. Carpets may have a loop pile or a cut pile, but in either case both the yarns and individual fibers themselves are generally vertically oriented. The carpet backing usually includes a primary backing and a secondary backing, the details of which need not be described here.

Most carpet soil consists of very small particles, the median particle size being on the order of about 2 microns while a typical carpet fiber to which such particle adheres is on the order of about 40 microns in diameter. The relative size of a typical adhering particle of carpet dirt is so small compared to the size of a single carpet fiber that beside the particle the fiber surface appears nearly flat.

Most carpet soil is applied by foot traffic. While loose particles, typically about 90% of carpet soil, accumulate in the carpet pile, about 10% of carpet soil is oily and adheres to the carpet fibers. Most adhering soil is applied to the top portion of the pile, primarily to the top one-third of the pile.

Loose carpet soil is removable by vacuuming, and aggressive vacuuming can even loosen some of the soil adhering to carpet fibers. However, soil which resists vacuuming continues to build up on the carpet fibers and as it builds up, the oily or sticky components tend to increase the rate which soil build-up occurs.

Carpet soil which has adhered to carpet fibers and cannot be removed by vacuuming requires loosening by contact with chemical cleaning agents and brushing. Virtually all carpet cleaning methods bring chemical cleaning agents, usually including water, in contact with the dirt adhering to carpet fibers in order to loosen it. However, the different ways in which this is accomplished have a very great effect on how well carpet is cleaned. While soil loosening is important, removal of the soil from the carpet is the objective.

The many different "wet" carpet cleaning methods, that is, methods in which a free (flowable) liquid is applied to the carpet in any fashion, loosen the dirt, but lose control of it in the process. The dirt is dispersed into the liquid, but only a portion of such dirty liquid is then removed. It is well known that no more than about 40 to about 70% of the liquid applied to a carpet is removable. Therefore, the dirt and cleaning agents in the remaining liquid remain in the carpet—as a residue on carpet fibers, on the carpet backing, and down in the carpet backing.

In contrast, a dry extraction carpet-cleaning method, brings chemical cleaning agents into contact with the dirt adhering to carpet fibers without using free liquid. Many tiny damp particles, made damp with specific carpet cleaning chemicals, are applied to the carpet and brushed through the carpet in a particular manner. The chemical content of the particles loosens the soil adhering to the carpet fibers, and the soil adheres to the particles much in the same way that dirt adheres to a damp sponge after wiping a dirty surface. Indeed, the particle composition, when brushed through the carpet pile, is like millions of tiny sponges scrubbing the carpet fibers.

After the brushing step, the particles are vacuumed from the carpet. The particles are sufficiently large that vacuuming removes the great majority of the particle composition, carrying the dirt and chemical content with it. The particle sizes are also sufficiently large that the particles remain above the carpet backing in position allowing removal by such vacuuming. Thus, such dry extraction carpet-cleaning method provides a high level of control in the dirt-loosening and removing steps—a substantial advantage over wet carpet-cleaning methods. And, using this dry extraction method, many of the problems associated with wet cleaning are avoided.

In recent years, an increased awareness has developed within the carpet industry of both the severe disadvantages of wet carpet-cleaning methods and the important advantages of a dry extraction carpet-cleaning method. Such awareness is greatest among those engaged in carpet manufacturing and marketing, where the risks of improper carpet maintenance are often the greatest. Many mills have come to specifically recommend a dry extraction method.

The cleaning industry has not been as quick to appreciate the strong advantages of the dry extraction carpet-cleaning method, and much wet carpet cleaning continues, with all its disadvantages and risks. Some who have an interest in continuing to supply chemicals and machines for old-style wet carpet cleaning have even pooled their resources in an effort to reverse the carpet industry trend toward the dry extraction method.

Those engaged in or concerned with carpet maintenance require technically accurate information regarding carpet care. If they can grasp such information quickly, they will retain it and it will affect their carpet-cleaning decisions.

Various means have been used to demonstrate certain points about carpet cleaning and carpet cleaning methods. Dirt has been dispersed in water and displayed, flat dirt-covered members have been sprayed or wiped to illustrate some of the disadvantages/advantages mentioned above, and the same sort of test has been performed using upright cylinders on a flat base.

There is a clear need for improved methods and means to demonstrate principles relating to carpet care. In particular, there is a need for an improved kit which can be used to visually demonstrate one or preferably a number of such principles. There is a need for a kit which, in addition to providing the tools for such demonstrations, can readily be disassembled and placed in condition for convenient carrying and storage.

SUMMARY OF THE INVENTION

This invention is a kit for visual demonstration of principles relating to carpet care and a method for visually demonstrating such principles.

The demonstration kit of this invention includes a horizontal base member and one or more vertical members which are erect when in position for most demonstrations. The vertical members have proximal ends adjacent to the base member and extend upwardly to terminate in distal ends above the base member. The kit has means on the base member for removably securing the proximal ends to it when the vertical members are erect, and means on the base member for holding the vertical members in a carrying position when removed from the securing means.

In highly preferred embodiments, there are a plurality of such vertical members and a plurality of securing means. The vertical members are preferably cylindrical and one or more vertical members preferably have a plurality of concentrically nestable cylindrical elements.

In highly preferred embodiments, the horizontal base member is a rigid box having spaced upper and lower walls, the upper wall having openings through it for each of the vertical members. The vertical members are removably secured to the lower wall of such rigid box, the securing means being affixed to the top surface of such lower wall, and extend upwardly through the openings to terminate in their distal ends at a position well above the upper wall.

The openings in the upper wall of the rigid box are preferably round and of a sufficient size such that their edges are spaced from the preferably cylindrical vertical members extending therethrough. Such spacing is large enough to allow liquid flowing down the vertical members to flow through the opening, but small enough such that a small sponge or other wiping member will rest on the upper wall rather than dropping through into the box.

The securing means, which are affixed to the top surface of the bottom wall of the rigid box, are preferably cylindrical members such that corresponding securing means and vertical members are removably attachable by insertion of one into the other. The securing means are preferably female, with the proximal ends of the vertical members being male. Common sizing is used whenever possible to provide maximum interchangeability for convenience in a variety of demonstrations.

In highly preferred embodiments of this invention, the rigid box is transparent such that the portions of the vertical members which are within the rigid box (when the vertical members are erect) and the top surface or the lower wall can be seen. This is useful in certain demonstrations.

The upper wall preferably forms a removable cover for the box which allows it to be used for convenient storage of the vertical members and other items used with the kit when not in use. The box has internal space adjacent to the securing means sufficient in size and shape for this purpose.

Each vertical member may have one, two, three or more vertical elements nestable with each other. That is, some vertical elements may be sleeved over other vertical elements. Some of the elements are opaque and others are transparent in order to achieve various effects in demonstrations.

In a preferred embodiment, one vertical member is a transparent hollow tube closed at its proximal end. This allows the tube to function as a display container for water or other liquid. Another vertical member has an opaque hollow tube closed at its proximal so that it may function as a liquid storage container. Such vertical opaque member may also include a transparent hollow tube which is sized to be sleeved over it.

Another preferred vertical member has an inner element which includes the proximal end for removable attachment to the base member and has a sleeve element sleeved over such inner element. In some cases, the sleeve element is transparent; in other cases it is opaque. An outer element may be sleeved over the sleeve element.

In one preferred embodiment, the inner element is a solid transparent member. In some preferred embodiments, a solid member can be used which is transparent along the portion of its length and frosted or otherwise made translucent along an adjacent portion of its length. In the latter case, dark markings may be made along one side, both on the transparent and transparent portions. This can help to illustrate certain characteristics of some types of carpet fibers.

The horizontal base member, such as the highly preferred rigid box, represents the carpet backing in several of the demonstrations which may be performed with the kit of this invention. The upper wall of the preferred rigid box and the space below the upper wall represent the carpet backing. Certain of the vertical members, in some of the demonstrations, represent fibers or yarns in a carpet pile. The space between the erect vertical members and the edges of the openings through which they extend is representative of the accessibility of various portions of the carpet backing to free (flowable) liquid applied to the carpet.

In a highly preferred method of this invention, the demonstration kit may be used to show both the lack of control of dirt in wet carpet cleaning and the controlled dirt removal of the aforementioned dry extraction carpet cleaning method. Such demonstration uses a shaft, preferably a light-colored opaque vertical member, positioned in the erect position, with its proximal end secured to the lower wall of the rigid box.

Either before or after such shaft positioning, dirt is applied onto the outer surface of the shaft at positions therealong near the distal end such that the dirt adheres to the shaft. The dirt is preferably dried onto the shaft. Then a cleaning step representative of one type of carpet-cleaning method is executed with respect to such dirty shaft. The demonstration is repeated using another dirty shaft and another cleaning step, representing another carpet-cleaning method.

One such cleaning step includes applying free liquid onto the dirty shaft, allowing the liquid to loosen the dirt from the shaft such that the liquid becomes visibly dirty, and allowing such dirty liquid to flow under the force of gravity farther down the shaft. Such gravity flow will continue through the opening and onto the lower wall, illustrating that free liquid applied to a carpet moves dirt farther down into the carpet and into the carpet backing.

Another form of cleaning step involves rubbing a damp wiping member, preferably a block-shaped wiper such as a damp sponge, on the dirty shaft such that dirt is released from the shaft and adheres to the wiping member without the presence of flowing liquid. Such damp wiping member and all the dirt adhering thereto is then removed from the shaft and away from the entire kit. Such sponge or other damp wiping member represents one tiny damp particle of a particle composition used in the dry extraction carpet cleaning method.

In this cleaning demonstration, using a sponge or other wiping member, it is plain that the dirt removal from the carpet fibers and yarns is controlled and that removal of the dirt entirely away from the carpet is highly controlled as well. In a particularly preferred form of this cleaning demonstration, the sponge or other wiping member, after it removes dirt from the shaft, is placed on the upper wall and remains there since it is too big to fall through one of the openings into the box. This demonstrates that the dirt is not carried down into the carpet backing when the dry extraction method is used. Then, the dirtied wiping member may be blown off easily, which demonstrates the easy removal of dirt and composition by vacuuming using the dry extraction method.

Many other demonstrations may be performed using the demonstration kit of this invention. These will be described in greater detail hereafter.

OBJECTS OF THE INVENTION

It is an object of this invention to provide a kit for improved visual demonstration of principles relating to carpet care.

Another object of this invention is to provide improved methods for visual demonstration of principles relating to carpet care.

Another object of this invention is to provide an improved kit for such demonstrations which may be easily used and which may readily be stored and carried.

These and other objects of the invention will be apparent from the following additional descriptions and from the drawings, wherein:

BRIEF DESCRIPTION OF THE DRAWINGS

FIG. 1 is a partially cutaway perspective view of the demonstration kit of this invention with its vertical members erect in demonstration position.

FIG. 2 is a reduced plan view of FIG. 1.

FIG. 3 is a reduced front elevation of FIG. 1.

FIG. 4 is a partially cutaway exploded front elevation.

FIG. 5 is a top plan view of the demonstration kit with its parts in storage position.

FIG. 6 is a right side elevation of the kit in storage condition as in FIG. 5.

DETAILED DESCRIPTIONS OF PREFERRED EMBODIMENT

The figures illustrate a kit 10 for visual demonstration of principles relating to carpet care.

Demonstration kit 10 includes a transparent rigid box 12 which includes a lower wall 14, front and rear walls 16 and 18, side walls 20, and an upper wall 22 which is parallel to and spaced from lower wall 14. Upper wall 22 has a series of four spaced round openings 24 through it. Affixed to the top surface 26 of lower wall 14 are four tubular cylindrical mounting members 28, each one in vertical alignment with one of the openings 24.

Four different vertical members 30 are removably secured to lower wall 14 by means of the four mounting members 28, such mounting members serving to hold vertical members 30 erect in vertical position. Each vertical member 30 has a male proximal end 32 which may be inserted snugly into any one of the female mounting members 28.

Vertical members 30 are each made up of one or more elements, and each of the elements of the four vertical members 30 are cylindrical and approximately of the same length. Some of the elements are solid, some are tubular, and some are closed near their proximal ends 32 and hollow thereabove such that they form containers. The elements are dimensioned so that in many cases they may be sleeved over or slid witin other elements.

Each of vertical members 30 is dimensioned to pass through the openings 24. Their outer diameters are less than the diameter of each of the openings 24. When vertical members 30 are mounted erect in mounting members 28, they extend through openings 24 to a position above upper wall 22. Such vertical members terminate upwardly in distal ends 34.

In certain demonstrations, vertical members 30, and/or certain elements of vertical members 30 represent fibers or yarns from a carpet pile, and rigid box 12 (or, more specifically, upper wall 22 and the space and structure below it) represents a carpet backing.

Upper wall 22 forms a removable cover of rigid box 12. Along the upper edges of front wall 16 and rear wall 18 are ledge members 36 on which upper wall 22 rests when rigid box 12 is closed. The lengths and widths of vertical members 30 and the dimensioning of rigid box 12 are such that vertical members 30 can be placed on their sides within rigid box 12, adjacent to mounting members 28, for storage when demonstration kit 10 is not in use. See FIGS. 5 and 6.

Each of the vertical members 30 is somewhat different from each of the other vertical members 30, although certain of their elements are identical. It should be understood that each of the vertical members 30 can be varied significantly for purposes of demonstrating various principles, and that in such demonstrations the various elements making up vertical members 30 are moved into and out of various relationships with other elements. For convenience, each of the vertical members 30 shown in the drawings have been arranged or assembled in a particular manner which will now be described.

Vertical member 38 includes a solid transparent shaft 46, which includes proximal end 32, and an opaque tube 48 dimensioned to slip readily, but fairly snugly, over solid shaft 46.

Vertical member 40 has only one member—a transparent hollow tube 50 which includes its proximal end 32 for erect mounting.

Vertical member 42 includes an opaque hollow tube 52, which includes proximal end 32, and a transparent tube 54 dimensioned to be sleeved snugly over opaque tube 52.

Vertical member 44 includes three elements: a solid shaft 56; a hollow opaque tube 58 which is similar to opaque tube 48 and is dimensioned to be sleeved snugly over solid shaft 56; and a transparent tube 60 which is similar to transparent tube 54 and is dimensioned to be sleeved snugly over opaque tube 58. Solid shaft 56 is transparent at its upper portion 62 and somewhat frosted on its outer surface along its lower portion 64. Upper and lower portions 62 and 64 each have dark markings on one side of solid shaft 56 for purposes which will hereafter be explained.

Kit 10 can be used for visual demonstration of a number of principles relating to carpet care. Some of the demonstrations which can be performed are simple representations of principles relating to the nature of carpet and carpet fibers which must be understood in order to make informed choices about carpet care and carpet care problems. Other possible demonstrations clearly communicate principles relating to carpet cleaning methods. Some demonstrations may be very simple in nature, yet graphically make an important point.

Demonstration of Topically-Dyed Fibers

Vertical member 38 be used to illustrate the nature of carpet fibers which have been colored by topical dying, to point out the risks of having carpet color dulled and ultimately lost if the carpet is maltreated during cleaning. Maltreatment can be in the form of severe chemical treatment, particularly using chemicals with high alkalinity or very hot solutions, and/or the use of pad cleaners (bonnets), particularly when abrasive dirt has accumulated due to failure to change the pad. Such maltreatment causes erosion of dye from certain arpet fibers.

In this demonstration, opaque tube 48 may be made in a bright color and sleeved over solid transparent shaft 46. The manual removal of colored opaque shaft 48 from transparent shaft 46, of course, leaves a rather dull appearing shaft not having the color that vertical member 38 had before tube 48 was removed. This principle can also be illustrated by removal of a colored transparent tube from a transparent or opaque shaft having little or no color.

Demonstration of Solution-Dyed Carpet Fibers

The display of a solid transparent or translucent colored shaft can illustrate a fiber of solution-dyed carpet, which, of course, is resistant to significant color loss by abusive cleaning methods.

Demonstration of Optical Properties of Cartpet Fibers

Another demonstration regarding the characteristics of certain carpet fibers can be made using solid shaft 56 with tubes 58 and 60 removed. As shown in FIG. 1, the surface of solid shaft 56 has dark markings 68 along one side, both on its upper portion 62 and its lower portion 64. The markings on the upper and lower portions 62 and 64 are identical.

When solid shaft 56 is oriented with markings 68 on its far side, as viewed in FIG. 4, it is apparent that such dark markings, or at least the vertical portions thereof, are magnified. Upper portion 62, which is transparent, shows the dirt magnification problem may be severe when carpet fibers are substantially transparent, as is the case with many old-style carpet.

However, the carpet industry frequently treats carpet fibers with delusterants, the effect of such treatment being demonstrated by the lower portion 64 of shaft 56, which is frosted. Such delusterant treatment makes the carpet fiber translucent to some extent, dulling the dirt magnification and thus serving to hide or deemphasize the presence of dirt on a dirty carpet. Turning solid shaft 56 demonstrates that dirt is still present on carpets having fibers treated with delusterants.

Demonstration of Extent of Soil Removal of Cleaning Methods

One key pair of demonstrations, which explain the controlled dirt-removal advantages of a dry extraction carpet-cleaning method and the substantial problems and disadvantages of widely used wet carpet-cleaning methods, may be carried out in an improved manner with preferred demonstration kit 10 of this invention.

Each of the demonstrations may be carried out using any one of the vertical elements (or "shafts"), but is most preferably carried out using an opaque vertical element such as tubes 48, 52 and 58. For such demonstrations the opaque tubes are preferably light-colored, most preferably white. It is most preferred that two such hard-surface shafts be used because there are two separate demonstrations which should be run one after the other.

In these demonstrations, wet dirt is applied, preferably rather heavily, onto two shafts, for example, tubes 52 and 58, at positions therealong near their distal ends 34. Such wet dirt is allowed to dry on such that it adheres to the outside surface of opaque tubes 52 and 58 and is readily visible against the light surfaces of such opaque tubes. It is preferred that approximately the top one-third of such tubes be heavily covered with dirt, since this represents the portion of carpet yarns and fibers on which foot-applied dirt which is unremovable by vacuuming normally adheres.

Either before or after the application of such dirt, opaque hollow tubes 52 and 58 are positioned vertically side by side, mounted in their respective mounting members 28. Any covering tubes are removed and placed to the side during these demonstrations. When in erect position, all or most of the dirt applied thereto is well above upper wall 22 of rigid box 12. Each positioned dirty shaft represents a fiber or yarn from a carpet pile, and upper wall 22, the space therebelow, and lower wall 14 together represent a carpet backing.

Different cleaning steps, representative of wet carpet cleaning methods on the one hand and a dry extraction carpet cleaning method on the other hand, are then executed with respect to such dirtied shafts.

Demonstration of Severe Problems of Wet Carpet-Cleaning Methods

A common characteristic of the many widely used wet carpet cleaning methods is the application of free liquid onto the carpet. That is, liquid in a flowable form is applied to the carpet for the purpose of loosening carpet soil adhering to pile yarns and fibers. Such free liquid, which is usually water with detergents and other carpet-cleaning chemicals, is applied to carpets in a variety of ways. The exact application method does not change the fact that free flowing liquid comes in contact with the carpet.

In this demonstration, free liquid is applied onto one of the dirty shafts, preferably by heavily spraying the dirtiest top portion of such shaft with water. After such liquid application, the liquid will loosen some of the dirt from the shaft. Under the force of gravity, such dirty liquid will flow down the shaft. Such downward flow of dirty liquid continues and a portion of such dirty liquid is allowed to flow through opening 24, carrying the dirt to a position below upper wall 20 and eventually onto top surface 26 of lower wall 14.

This flowing action clearly transports dirt onto the cleaner lower portions of the shaft, and such dirty water flow can easily be seen against the light opaque shaft. It becomes quite apparent that while the dirt or a good portion of the dirt has been loosened from the top portion of the shaft, much of it has flowed farther down the shaft and to the less accessible position beneath upper wall 22.

This demonstrates the loss of control of dirt using wet carpet-cleaning methods and the fact that such methods cause dirt to move deeper into the carpet and cause dirt and liquid to move into the carpet backing. When it is explained that much of such dirty and chemical-laden water will dry in place, it becomes apparent that a substantial amount of such dirt will remain on and in the carpet. It becomes apparent that the main affects of wet carpet cleaning methods are: loosening of top dirt to give a temporary clean look; relocation of a substantial portion of such top dirt to a lower position with all the problems which that brings; and movement of liquid into the carpet backing, which is known to carry risks of mildewing, rotting, seam splitting, delamination, shrinkage, wood rot, and other problems.

Demonstration of Advantages of a Dry Extraction Cleaning Method

The controlled dirt-removal advantages of a dry extraction carpet-cleaning method are demonstated by rubbing a damp wiping member, such as a damp sponge block 66, on the dirty surface of the other dirty shaft. Such wiping action causes the dirt to be removed from the shaft and to adhere to the damp wiping member and such dirt transfer is accomplished without the presence of flowing liquid. The amount of dampness in damp sponge 66 is well less than an amount which would cause release of flowing liquid by the rubbing action described.

Such damp wiping member or sponge 66 represents one tiny damp particle of a particle composition for cleaning carpets. More specifically, such damp sponge is representative of one particle of the dry extraction carpet cleaning composition sold under the trademark HOST by Racine Industries, Inc., of Racine, Wisconsin.

Sponge 66 is preferably a light-colored or white sponge such that the dirt removed from the solid shaft by the rubbing action is plainly apparent to the eye. Sponge 66 is dimensioned such that it cannot pass through any of the openings 24 through which vertical members 30 extend, at least while such members are in erect position.

After the rubbing step by which dirt is transferred from the shaft onto one or more sponges 66, such sponges may be placed loosely on top of upper wall 22 to illustrates that particles of such HOST particle composition, after they have been repeatedly rubbed against carpet yarns and fibers and have removed the dirt therefrom, will settle no farther into the carpet than a position above the top of the carpet backing. They will not move down into the carpet backing.

As sponges 66 rest on the top of upper wall 22, they may readily be blown off. This illustrates the ease with which such particles may be removed from the carpet by vacuuming. Indeed, each of the characteristics of this demonstration illustrate the controlled removal of carpet dirt from carpet fibers from the loosening and removal of dirt from the fibers and yarns to the complete physical removal from the carpet.

Demonstration of Loss of Dirt Control in Wet Cleaning Methods

Another demonstration can be performed using transparent hollow tube 50, which is in effect a transparent container. By pouring some dirt into transparent hollow tube 50 and adding water to it, it can be seen that the application of flowing water to a carpet tends to disperse the dirt such that dirty liquid, rather than just dirt, is on the carpet.

Then, by removing transparent hollow tube 50 from its mounting member 28, a portion, and only a portion, of the dirty water can be poured out. This demonstrates that a substantial amount of dirty water remains in the carpet, as previously noted.

The water which is poured into transparent hollow tube 50 to be mixed with the dirt may be stored in opaque hollow tube 52, so that it is conveniently available during the demonstration.

Demonstration of Dirt Transfer by Wet Cleaning Methods

Still another demonstration may be made using dirty water within a hollow tube container, preferably transparent hollow tube 50. A white heavy rope (not shown) can be repeatedly dipped into such dirty water, and with each dip such rope will become quite apparently dirtier.

The rope represents a carpet yarn, particularly an individual tuft which is from an area of the carpet which not as dirty as other parts. It can be seen that the dirty liquid created from the more-soiled portions of the carpet will, using certain wet cleaning methods, be applied to relatively clean tufts. And, it can be easily seen that this has a deleterious affect on the appearance of such tuft, and on the appearance of the carpet.

Demonstration of Problems of "Bonnet" or "Spin" Wet Cleaning

A further demonstration can be performed using such wet rope. By rubbing the top of the soaking wet rope in a side-to-side or circular horizontal motion, the fibers of the rope will spread apart and the end of the rope will "flower." Such flowering of the rope end is representative of damage which occurs to carpet yarns in certain wet carpet cleaning steps, particularly in bonnet or spin-pad carpet scrubbing.

Demonstration of Dirty Residues Left on Fibers by Wet Cleaning

One demonstration preferably utilizes a transparent tube, such as tube 54 or tube 60, over another vertical member, preferably a light-colored opaque member such as tube 52 or tube 58. The transparent tube is covered, preferably on its inside surface, with a mixture of a liquid carpet-cleaning composition and carpet dirt and such mixture is allowed to dry on the tube to leave a very apparent residue. Such dirtied clear tube may then be slid over a clean opaque tube, which provides background to emphasize the dirty residue on the transparent tube.

This demonstrates what occurs on carpet fibers and yarns when a wet carpet-cleaning method is used. The fibers and yarns are covered by a dirty residue after evaporation of the liquid.

When the residue is on the outside of the transparent tube, an additional point is demonstrated. By running one's fingers over such dried residue, it is easy to develop an understanding of how carpet cleaned by wet carpet-cleaning methods more quickly resoils. The roughness of the residue-laden fibers causes the transfer of new dirt from the soles of shoes onto carpet fibers at an increased rate.

Of course, removal of the residue-laden transparent tube reveals a clean shaft representative of a carpet fiber cleaned by the aforementioned dry extraction carpet cleaning method.

Demonstration of Problems of Later-Applied Carpet "Guards"

Another demonstration can be made by sliding a clean transparent tube, such as tube 54 or tube 60, over a residue-covered inner tube, preferably an opaque member such as tube 52 or tube 58. It is clear that the residue on the inner tube is made inaccessible by the presence of the clean transparent tube.

The residue-covered opaque tube is representative of a carpet fiber or yarn which has not been properly cleaned, for example, because a wet carpet-cleaning method was used. The clean transparent tube is representative of one of the many carpet fiber coatings, often referred to as "guards," which are sometimes applied after carpet cleaning. Such coatings are used to decrease carpet surface energy and thus provide resistance to resoiling of carpet fibers.

Covering the residue-covered inner tube with a transparent hollow tube illustrates that such carpet guards can lock the dirt in when improper cleaning methods have been used, making the dirt less accessible and thus less easily removed in subsequent cleaning operations.

Rigid box 12 is preferably made of clear acrylic plastic or other clear plastics, and any well-known fabrication method such as adhesive sealing. Mounting members 28 may be cylindrical members, preferably made of a similar clear plastic, which are affixed to top surface 26 of lower wall 14 using an adhesive or other sealing method.

The various elements of vertical members 30 may also be made of well known plastics, glass, or various other materials. It is preferred that the transparent members be made of acrylic plastic. The opaque members may have a opaque surface coating or may be made of opaque plastics such as polyvinyl cloride.

Demonstration kit 10 may be varied in many different ways, including changing the number of vertical members 30, shortening or lengthening such members, changing the shape of rigid box 12, changing the form of the base member, and providing alternate means to attach the vertical members to the base for carrying and storage during nonuse, to name just a few.

While the principles of this invention have been described in connection with specific embodiments, it should be understood clearly that these descriptions are made only by way of example and are not intended to limit the scope of the invention.

What is claimed:

1. A kit for visual demonstration of principles relating to carpet care comprising:
    a horizontal base member;
    at least one vertical member representing a carpet fiber, said member being erect in demonstration position, having a proximal end adjacent to the base member, and extending upwardly to terminate in a distal end above the base member, the at least one such vertical member being cylindrical and having a plurality of relatively axially slidable elements, each of which is cylindrical;
    means on the base member for removably securing the proximal end thereto when the vertical member is erect; and
    means on the base member for holding the at least one vertical member in a carrying position when it is removed from the securing means.

2. The kit of claim 1 wherein one vertical member comprises an opaque hollow tube closed at its proximal end, and wherein the kit includes a transparent hollow tube sized to be sleeved over the opaque hollow tube.

3. A kit for visual demonstration of principles relating to carpet care comprising:
    a horizontal base member;
    at least one vertical member representing a carpet fiber, said member being erect in demonstration position, having a proximal end adjacent to the base member, and extending upwardly to terminate in a distal end above the base member, the at least one such vertical member being a transparent hollow tube closed at its proximal end;
    means on the base member for removably securing the proximal end thereto when the vertical member is erect; and
    means on the base member for holding the at least one vertical member in a carrying position when it is removed from the securing means.

4. A kit for visual demonstration of principles relating to carpet care comprising:
    a horizontal base member;
    at least one vertical member which is erect in demonstration positon, has a proximal end adjacent to the base member, and extends upwardly to terminate in a distal end above the base member;
    means on the base member for removably securing the proximal end thereto when the vertical member is erect;
    the vertical member having an inner element including the proximal end of removable attachment to the securing means and a sleeve element sleeved over the inner element; and
    means on the base member for holding the at least one vertical member in a carrying position when it is removed from the securing means.

5. The kit of claim 4 further comprising an outer element sleeved over the sleeve element.

6. The kit of claim 4 wherein the inner element is a solid transparent member.

7. A kit for visual demonstration of principles relating to carpet care comprising:
    a rigid transparent box having spaced upper and lower walls, the upper wall having at least one opening therethrough and the lower wall having a top surface;

at least one vertical member, representing a carpet fiber, said member being erect in demonstration position, having a proximal end adjacent to the lower wall, and extending upwardly through one of the openings to terminate in a distal end above the upper wall; and means on the top surface of the lower wall for removably securing the proximal end to the lower wall.

8. The kit of claim 7 having a plurality of the vertical members and a plurality of the securing means.

9. The kit of claim 8 wherein one of the vertical members comprises a transparent hollow tube closed at its proximal end.

10. The kit of claim 7 wherein:

the upper wall is a removable cover for the box; and the box has space therein adjacent to the securing means for storage of the at least one vertical member.

11. A kit for visual demonstration of principles relating to carpet care comprising:

a rigid box having spaced upper and lower walls, the upper wall having at least one round opening therethrough and the lower wall having a top surface;

a plurality of cylindrical vertical members which are erect in demonstration position, have a proximal end adjacent to the lower wall, and extend upwardly through one of the openings to terminate in a distal end above the upper wall, said opening having an edge spaced from said vertical member when erect;

at least one such vertical member having a plurality of elements each of which is cylindrical; and means on the top surface of the lower wall for removably securing the proximal end to the lower wall.

12. The kit of claim 11 wherein:

the securing means are cylindrical members affixed at the top surface; and corresponding vertical members and securing means being removably attached by insertion of one into the other.

13. The kit of claim 12 wherein the securing means are female and the proximal ends of the vertical members are male.

14. A kit for visual demonstration of principles relating to carpet care comprising:

a rigid box having spaced upper and lower walls, the upper wall having at least one opening therethrough and the lower wall having a top surface;

a plurality of vertical members which are erect in demonstration position, have a proximal end adjacent to the lower wall, and extend upwardly through one of the openings to terminate in a distal end above the upper wall;

means on the top surface of the lower wall for removably securing the proximal end to the lower wall; and one of said vertical members having an inner element which includes the proximal end for removable attachment to the securing means and a sleeve element sleeved over the inner element.

15. The kit of claim 14 further comprising an outer element sleeved over the sleeve element.

16. The kit of claim 14 wherein the inner element is a solid transparent member.

17. A kit for visual demonstration of principles relating to carpet care comprising:

a rigid box having spaced upper and lower walls, the upper wall having at least one opening therethrough and the lower wall having a top surface;

a plurality of vertical members which are erect in demonstration position, have a proximal end adjcaent to the lower wall, and extend upwardly through one of the openings to terminate in a distal end above the upper wall;

one of said vertical members including an opaque hollow tube closed at its proximal end;

a transparent hollow tube sized to be sleeved over the opaque hollow tube; and means on the top surface of the lower wall for removably securing the proximal end to the lower wall.

18. A method for visually demonstrating principles relating to carpet cleaning comprising:

positioning vertically at least one hard shaft mounted at its proximal end to a lower wall and extending through an opening in an upper wall, spaced above the lower wall, to a distal end above the upper wall;

in any order with respect to the positioning step, applying dirt onto the hard shaft at positions therealong near the distal end such that the dirt adheres to the shaft; and executing a cleaning step with respect to the dirty shaft, whereby the hard shaft represents a fiber or yarn from a carpet pile and the upper wall and the space therebelow represents the carpet backing.

19. The demonstration of claim 18 wherein the cleaning step comprises:

applying free liquid onto the dirty shaft;

allowing the liquid to loosen the dirt from the shaft such that the liquid becomes dirty;

allowing a portion of the dirty liquid to flow under the force of gravity farther down the shaft, including some through the opening and onto the lower wall to move dirt to a lower less accessible position, thereby demonstrating certain disadvantages and problems of wet carpet-cleaning methods.

20. The demonstration of claim 18 wherein the cleaning step comprises:

rubbing a damp wiping member on the dirty shaft such that the dirt is released from the shaft and adheres to the wiping member without the presence of flowing liquid, the damp wiping member representing one tiny damp particle of a particle composition for cleaning carpets; and removing the dirty wiping member, thereby demonstrating the controlled dirt-removal advantages of a dry extraction carpet-cleaning method over wet carpet-cleaning methods.

21. The demonstration of claim 20 wherein the wiping member is a sponge.

22. The demonstration of claim 20 wherein:

the wiping member is dimensioned such that it cannot pass through the opening onto the lower wall; and prior to the removing step the wiping member is placed loose on the upper wall, thereby demonstrating the easy removal by vacuuming of such particle composition for carpet cleaning.

* * * * *

UNITED STATES PATENT AND TRADEMARK OFFICE
CERTIFICATE OF CORRECTION

PATENT NO. : 4,772,207

DATED : September 20, 1988

INVENTOR(S) : Lawrence J. LaFontsee et al.

It is certified that error appears in the above-identified patent and that said Letters Patent is hereby corrected as shown below:

Title page:

In the Abstract, line 9, delete "attacked" and insert --attached--.

In column 4, line 10, delete "or" and insert --of--.

In column 4, line 46, delete the first instance of the word "transparent" and insert in its place --translucent--.

In column 6, line 35, delete "witin" and insert --within--.

In column 7, line 37, after "38" insert --can--.

In column 7, line 46, delete "arpet" and insert --carpet--.

In column 7, line 63, delete "Cartpet" and insert --Carpet--.

In column 8, line 9, delete "carpet." and insert --carpets.--.

In column 9, line 32, delete "affects" and insert --effects--.

In column 10, line 46, after "which" insert --is--.

In column 10, line 50, delete "affect" and insert --effect--.

In column 11, line 60, delete "a" and insert --an--.

UNITED STATES PATENT AND TRADEMARK OFFICE
CERTIFICATE OF CORRECTION

PATENT NO. : 4,772,207

DATED : September 20, 1988

INVENTOR(S) : Lawrence J. LaFontsee et al.

Page 2 of 2

It is certified that error appears in the above-identified patent and that said Letters Patent is hereby corrected as shown below:

In column 12, line 55, delete "of" and insert --for--.

Signed and Sealed this

Twenty-eighth Day of November 1989

*Attest:*

JEFFREY M. SAMUELS

*Attesting Officer*     *Acting Commissioner of Patents and Trademarks*